Sept. 4, 1923.

O. P. WHITSON 1,467,215

LUG SHIELD

Filed April 22, 1922

Inventor
Ora P. Whitson.

Watson E. Coleman
Attorney.

Patented Sept. 4, 1923.

1,467,215

UNITED STATES PATENT OFFICE.

ORA P. WHITSON, OF NEWARK, ILLINOIS.

LUG SHIELD.

Application filed April 22, 1922. Serial No. 556,059.

*To all whom it may concern:*

Be it known that I, ORA P. WHITSON, a citizen of the United States, residing at Newark, in the county of Kendall and State of Illinois, have invented certain new and useful Improvements in Lug Shields, of which the following is a specification, reference being had to the accompanying drawings.

This invention relates to improvements in lug shields for tractors, and has for an important object thereof the provision of a resilient lug shield for covering the lugs or flanges of the tractor wheels when it is desired to operate the same upon a paved street or other surface which would be damaged by the passage of the lugs thereover.

A further object of the invention is to provide a device of this charcter which may be readily applied to the wheel and which when applied provides in effect a resilient tire for the tractor wheels.

A still further object of the invention is to provide in a device of this character means for preventing the lugs or flanges of the tractor wheels from cutting and destroying the resilient cover.

These and other objects I attain by the construction and arrangement shown in the accompanying drawings wherein for the purpose of illustration is shown a preferred embodiment of my invention and wherein like reference characters designate like parts throughout.

In the drawings:

Figure 1 is a fragmentary side elevation showing the protector strip applied to the flange of the front wheel;

Figure 2 is a plan view thereof;

Figure 3 is a transverse sectional view taken therethrough;

Figure 4 is a side elevation showing the protector strips applied to the flanges of the rear wheel of a tractor;

Figure 5 is a longitudinal sectional view therethrough; and

Figure 6 is a detail view showing the manner of forming the protector strips where the wheel flanges are provided with double flanges.

Figure 7 is a view of the obverse side of the rear wheel showing the manner of attaching the lug protectors to the wheel at this side.

Referring now more particularly to the drawings, the numeral 10 designates a front wheel of a tractor which, as well known to those familiar with the art, is usually provided with a circumferentially extending annular flange 11 formed from a piece of angle iron, one arm of which projects outwardly in the plane of the wheel from the circumference thereof and the other arm 12 of which is secured to the wheel 10.

The numeral 13 indicates a protector strip formed from resilient material, such as the rubber from which ordinary tire truck wheels are formed, of sufficient length to extend about the circumference of the wheel, the ends slightly spaced, as indicated at 14, to allow for expansion in use. In its under surface the strip 13 is provided with a slot 15 into which the wheel flange 11 extends, the groove having its upper end enlarged, as indicated at 16, and being of slightly greater depth than the depth of the flange 11 so as to permit of collapsing of the resilient strip to provide resiliency. In order to prevent the flange 11 from cutting the strip, a protector plate 17 is preferably installed in the upper end 16 of the groove 15, this plate being in V form and having the apex thereof directed away from the flange when the strip 13 is in applied position or toward the outer edge of the strip. When the strip is collapsed by the weight of the tractor this protector strip 17 comes into engagement with the flange preventing cutting of the resilient strip 13. It will be understood that these flanges in use become worn and the corners thereof removed tending to sharpen the flange to such an extent that it would readily cut the resilient member were the plate or some similar contrivance not employed.

The numeral 18 designates the rear wheel of a tractor provided with transversely diagonal flanges or lugs 19 secured to the wheel by a flange or flanges 20. In some instances these lugs extend across the entire width of the rear tractor wheel and in other instances they terminate short of the sides of the wheel, the latter construction being herein illustrated. With this construction I preferably employ strips of material 21 having a groove 22 receiving the flange 19, the upper end of which is enlarged, as at 23, after the manner previously described and provided with a protector plate 24, a strip 21 being provided for each of the flanges or lugs 19 of the wheel. The groove 22 preferably terminates short of one end of the strip 21 and this end has embedded therein or suitably attached thereto an eye bolt 25. The opposite end of these strips is provided with openings 26 by means of which attaching members 27 may be applied.

It will be noted that in the construction illustrated in each instance the flange or lug 11 or 19, as the case may be, is provided with a single attaching flange whereas in some instances double attaching flanges are provided for these devices. Where the double attaching flange is provided the lower or inner faces of the protector strips 13 and 21 abut the upper surface of this flange and are shaped to conform thereto, as illustrated in Figure 6. Where a single flange is provided, the material of the strip at one side of the groove is shaped to conform thereto, as indicated at 28, and the material at the other side abuts the surface of the wheel, as indicated at 29.

In the present instance the strip 13 for protecting the flange of the front wheel of the tractor is shown as provided with chains 30 secured to one end and engaging through eyes 31 secured to the other end to hold the strip in assembled relation about the wheel.

In attaching the lug protectors to the lugs of the rear wheels where the lugs extend transversely of the wheel, the attaching members connected in the openings 26 are preferably passed about the spoke 32 of the wheel and secured together as shown in Figures 5 and 7. At the opposite side of the wheel where the lug protectors are provided with the eyes 25, a continuous chain 33 similar to the side chain of an automobile skid chain is preferably provided, passing through the eyes 25 and having its ends secured together by means of a separable fastener 34. This construction permits of maintenance of the assembly of the lug protectors for each wheel and keeps them constantly together.

I claim:

1. A lug protector for the lugs of tractor wheels comprising a strip of resilient material having a slot into which the lug extends of greater depth than the height of the lug.

2. A lug protector for the lugs of tractor wheels comprising a strip of resilient material having a slot into which the lug extends of greater depth than the height of the lug, the upper end of the slot being enlarged.

3. A lug protector for the lugs of tractor wheels comprising a strip of resilient material having a slot into which the lug extends of greater depth than the height of the lug, the upper end of the slot being enlarged, and a protector strip interposed between the head of the slot and the edge of the lug.

4. A lug protector for the lugs of tractor wheels comprising a strip of resilient material having a slot into which the lug extends of greater depth than the height of the lug, the upper end of the slot being enlarged, a protector strip interposed between the head of the slot and the edge of the lug, and means for securing the strip in position upon the lug.

In testimony whereof I hereunto affix my signature.

ORA P. WHITSON.